United States Patent [19]
Hatakenaka et al.

[11] Patent Number: 6,075,949
[45] Date of Patent: Jun. 13, 2000

[54] ELECTRONIC CAMERA

[75] Inventors: Akira Hatakenaka, Hino; Akio Terane, Sagamihara; Masaomi Tomizawa, Hachioji, all of Japan

[73] Assignee: Olympus Optical Co., Ltd., Tokyo, Japan

[21] Appl. No.: 09/149,622

[22] Filed: Sep. 8, 1998

[30] Foreign Application Priority Data

Sep. 9, 1997 [JP] Japan .................................. 9-244475

[51] Int. Cl.[7] .............................. G03B 7/26; H04N 5/225
[52] U.S. Cl. .......................... 396/301; 396/302; 348/372
[58] Field of Search .............................. 348/372; 395/106, 395/114; 358/906, 909.1; 396/429, 303, 301, 302, 304

[56] References Cited

U.S. PATENT DOCUMENTS

| | | | |
|---|---|---|---|
| 4,429,975 | 2/1984 | Shiozawa et al. | 396/303 |
| 5,705,891 | 1/1998 | Ishida et al. | 315/1 |
| 5,894,326 | 4/1999 | McIntyre et al. | 348/333 |
| 5,946,031 | 8/1999 | Douglas | 348/207 |

*Primary Examiner*—Safet Metjahic
*Assistant Examiner*—Hung Henry Nguyen
*Attorney, Agent, or Firm*—Volpe and Koenig, P.C.

[57] ABSTRACT

An electronic camera includes a driving power supply unit which can be selectively connected to, as a driving power supply, an internal power supply including a battery and an external power supply, an image sensing unit for sensing an image and generating image data, a recording unit for signal-processing the image data from the image sensing unit and recording the data on a recording medium, a reconstruction unit for reconstructing an image from the recording medium and outputting the reconstructed image data to a printer, a display unit for selectively displaying a picture, a reconstructed image, and an operation menu, a power supply recognition unit for recognizing whether the driving power supply is a battery, and a control unit for inhibiting display by the display unit in accordance with the operation state of the printer when the power supply recognition unit recognizes the battery as the driving power supply.

12 Claims, 3 Drawing Sheets

ELECTRONIC CAMERA

BACKGROUND OF THE INVENTION

The present invention relates to an electronic camera and, more particularly, to an electronic camera for reconstructing a plurality of sensed images and outputting the reconstructed image data to a printer.

Recently, electronic cameras such as a digital camera for electronically recording an image sensed by an image sensor such as a CCD are widely spread. In general, image data obtained by sensing an image with such an electronic camera is transferred to an information processor such as a personal computer, and printed out from a printing apparatus (to be simply referred to as a printer hereinafter) such as a printer connected to the information processor.

Also in recent years, the following electronic camera apparatus has been used in practical applications. In this electronic camera apparatus, the electronic camera and the printer are directly connected by a data transfer cable or the like without mediacy of the information processor, and image data of the electronic camera is directly output to the printer and printed using the printing function of the electronic camera.

The electronic camera uses a relatively-small-capacity dry battery, lithium battery, or charging battery as a driving power supply. The electronic camera is also driven by power supplied from a general AC power supply. As a display apparatus for reconstructing and displaying image data and the like obtained by sensing an image with the electronic camera, a liquid crystal display (LCD) is employed.

To output image data obtained by the electronic camera to the printer, and print the data, a desired image is selected, and an operation for executing printing is performed, while a plurality of sensed images are reconstructed. Then, the predetermined image data is output to the printer, and the desired image corresponding to the image data is printed.

While the electronic camera is driven with a relatively-small-capacity battery, the display apparatus is driven to reconstruct the image sensed by this camera, and directly connected to the printer to print the image. In this case, printing in progress becomes difficult to execute due to a lack of the power supply capacity. In the worst case, printing in progress may stop.

BRIEF SUMMARY OF THE INVENTION

It is an object of the present invention to provide an electronic camera which has a means for recognizing the driving power supply, when the electronic camera is recognized to be driven with a small-capacity driving power supply, realizes power saving by stopping display by a display means and suppressing the power consumption at the start of printing, and realizes excellent operability.

The present invention provides an electronic camera comprising a driving power supply unit which can be selectively connected to, as a driving power supply, an internal power supply including a battery and an external power supply, an image unit for sensing an image, generating image data, and processing the image data, a recording unit for recording the image data from the image unit on a recording medium, a connector unit to which a printer can be connected, a reconstruction unit for reconstructing a plurality of images from the recording medium and outputting the reconstructed image data to the printer, a display unit for selectively displaying a picture, a reconstructed image, and an operation menu, a power supply recognition unit for recognizing whether the driving power supply is a battery, and a control unit for inhibiting display by the display unit in accordance with the operation state of the printer when the power supply recognition unit recognizes the battery as the driving power supply.

According to the present invention, there is provided an electronic camera further comprising an operation unit for temporarily performing display on the display unit while the printer executes printing.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

An embodiment of the present invention will be described below with reference to the several views of the accompanying drawing.

Figure 1:
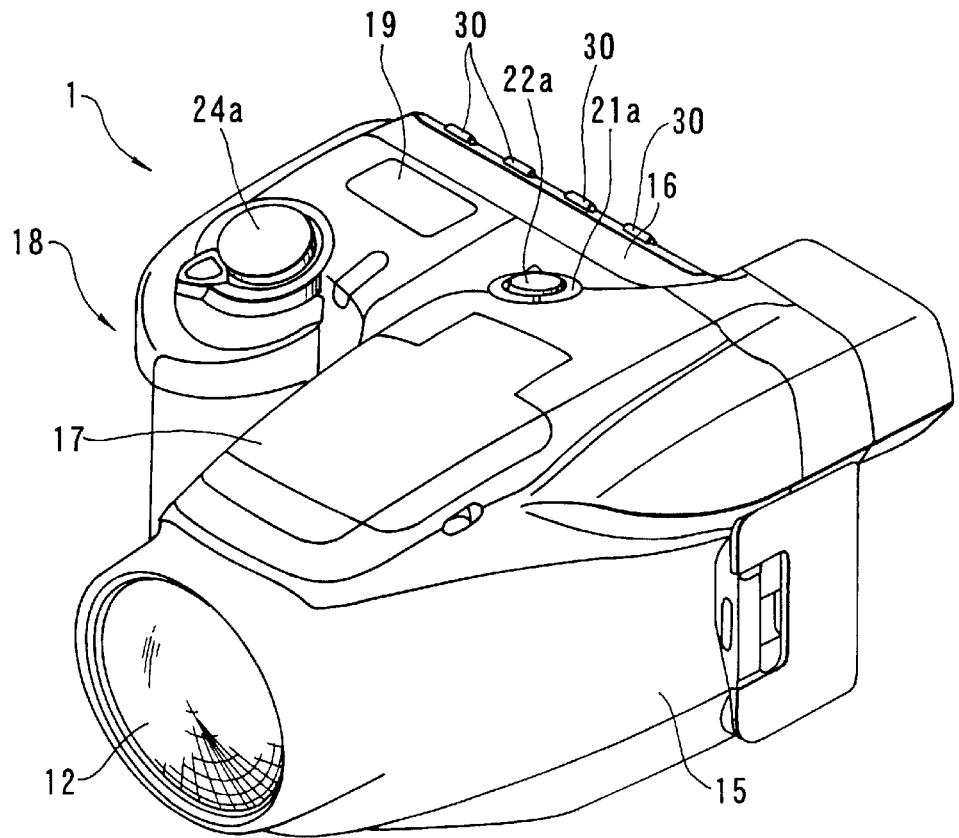
FIG. 1 is a perspective view showing the outer appearance of the front side of an electronic camera according to an embodiment of the present invention.
Figure 2:
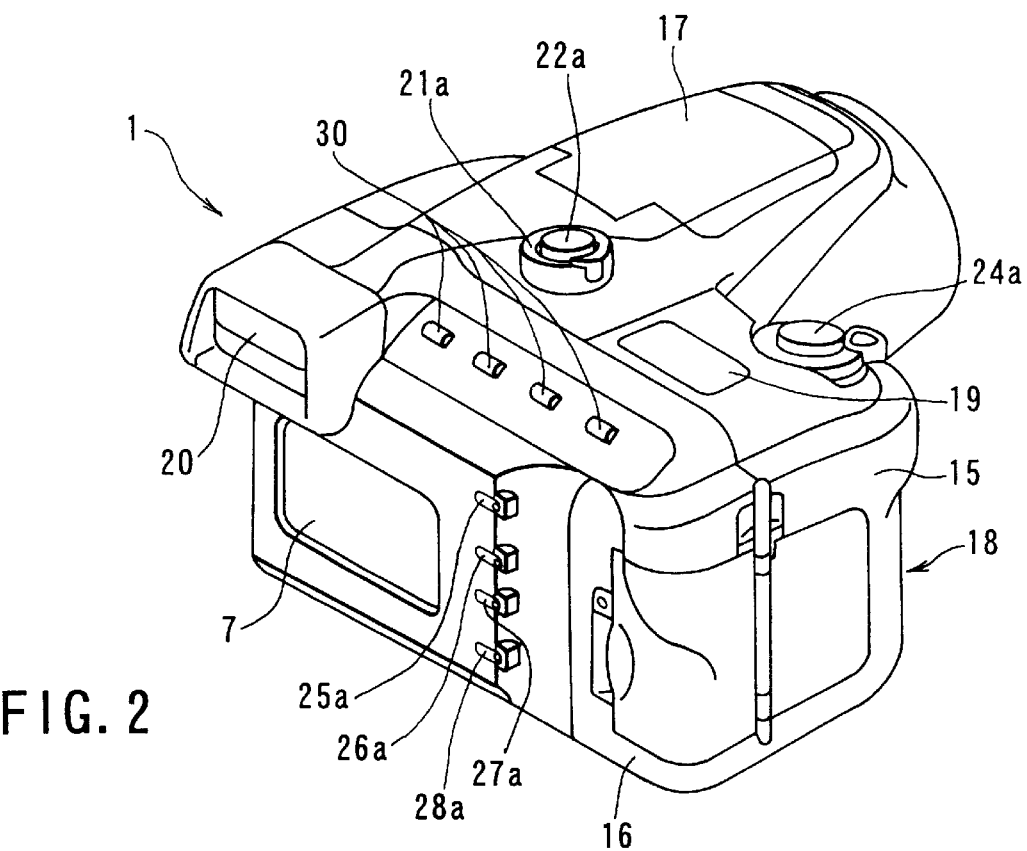
FIG. 2 is a perspective view showing the outer appearance of the rear side of the electronic camera in FIG. 1.

As shown in FIGS. 1 and 2, an electronic camera 1 of this embodiment is constituted by two outer cover members, i.e., a front cover 15 and a rear cover 16. An image-pickup optical system 12 made up of an image-pickup lens and the like is mounted on the front side of the front cover 15. A so-called pop-up built-in electronic flash 17 is attached to the top of the front cover 15. FIGS. 1 and 2 show the state wherein the electronic flash 17 is stored.

A power supply switch button 22a is arranged at substantially the center of the top of the front cover 15. The power supply switch button 22a is interlocked with a power supply switch 22 (see FIG. 3) inside the camera 1. By operating the button 22a, at least a power supply OFF command of power supply ON and OFF commands is generated to turn off the power supply of the electronic camera 1.

An annular image-pickup/reconstruction switch button 21a freely pivotal about the power supply switch button 22a is formed around the button 22a. The image-pickup/reconstruction switch button 21a is interlocked with an image-pickup/reconstruction switch 21 (see FIG. 3) inside the camera 1. By pivoting the button 21a, the electronic camera 1 can be switched between image-pickup and reconstruction modes.

A grip 18 is formed at one side edge of the front cover 15 with such a shape as to allow the operator to easily grip the electronic camera 1. A trigger switch button 24a is arranged on the top of the grip 18. The trigger switch button 24a is interlocked with a trigger switch 24 (see FIG. 3) inside the camera 1. By operating the trigger switch button 24a, a trigger command for image-pickup and recording is generated.

A display 19 such as an LCD for displaying the state of the electronic camera 1, e.g., the number of images which have been picked up, the number of images which can be picked up, and the image-pickup mode setting information is arranged near the trigger switch button 24a.

As shown in FIG. 2, a display 7 such as an LCD is arranged on the flat surface of the rear side of the rear cover 16 with the display surface facing the rear surface of the electronic camera 1. When the electronic camera 1 is in the image-pickup mode, the display 7 displays the image of a subject to be sensed, and functions as a viewfinder for confirming an image to be sensed and determining the composition or the like. The display 7 can also display various image-pickup modes and main operation menus as selection setting information in setting the state of the camera and the like. When the electronic camera 1 is in the reconstruction mode, the display 7 functions as a reconstruction image display for reconstructing and displaying a pickup image. That is, the display 7 can reconstruct and display an image. At the same time, the display 7 can display attendant information for image data, such as the image-pickup date and time and the frame number superimposed on a corresponding image (see FIG. 4), can display a reconstructed image in printing, and can display a print menu 35a (see FIG. 5) as the menu of a plurality of print execution commands corresponding to a plurality of different print states.

A menu switch button 25a, an increment switch button 26a, a decrement switch button 27a, and an execution switch button 28a are juxtaposed near one side edge of the display 7. The menu switch button 25a is interlocked with a menu switch 25 (see FIG. 3) inside the camera 1, and used to display the main operating menu and the like on the display 7. The increment switch button 26a and the decrement switch button 27a are respectively interlocked with an increment switch 26 and a decrement switch 27 (see FIG. 3) inside the camera 1, and used to change the frame number in an increment or decrement direction in selecting a desired image to be reconstructed and displayed on the display 7 from a plurality of pickup images, and to select a desired command item from the display items of the print menu 35a displayed on the display 7. The execution switch button 28a is interlocked with an execution switch 28 (see FIG. 3) inside the camera 1, and used to generate an execution command for executing a desired command item selected from the contents of the print menu 35a displayed on the display 7.

An eyepiece viewfinder 20 formed from a viewfinder optical system is arranged at the other side edge of the top of the rear cover 16. Four operation buttons 30 which are respectively interlocked with switches (not shown) inside the camera 1 to allow setting of various operation modes and the like are aligned at the upper edge of the rear cover 16 near the eyepiece viewfinder 20. These operation buttons 30 are interlocked with a print switch 23 (see FIG. 3) inside the camera 1, and include a print switch button for displaying the print menu 35a (see FIG. 5) on the display 7 in printing.

The internal arrangement of the electronic camera 1 will be described with reference to FIG. 3.

Figure 3:
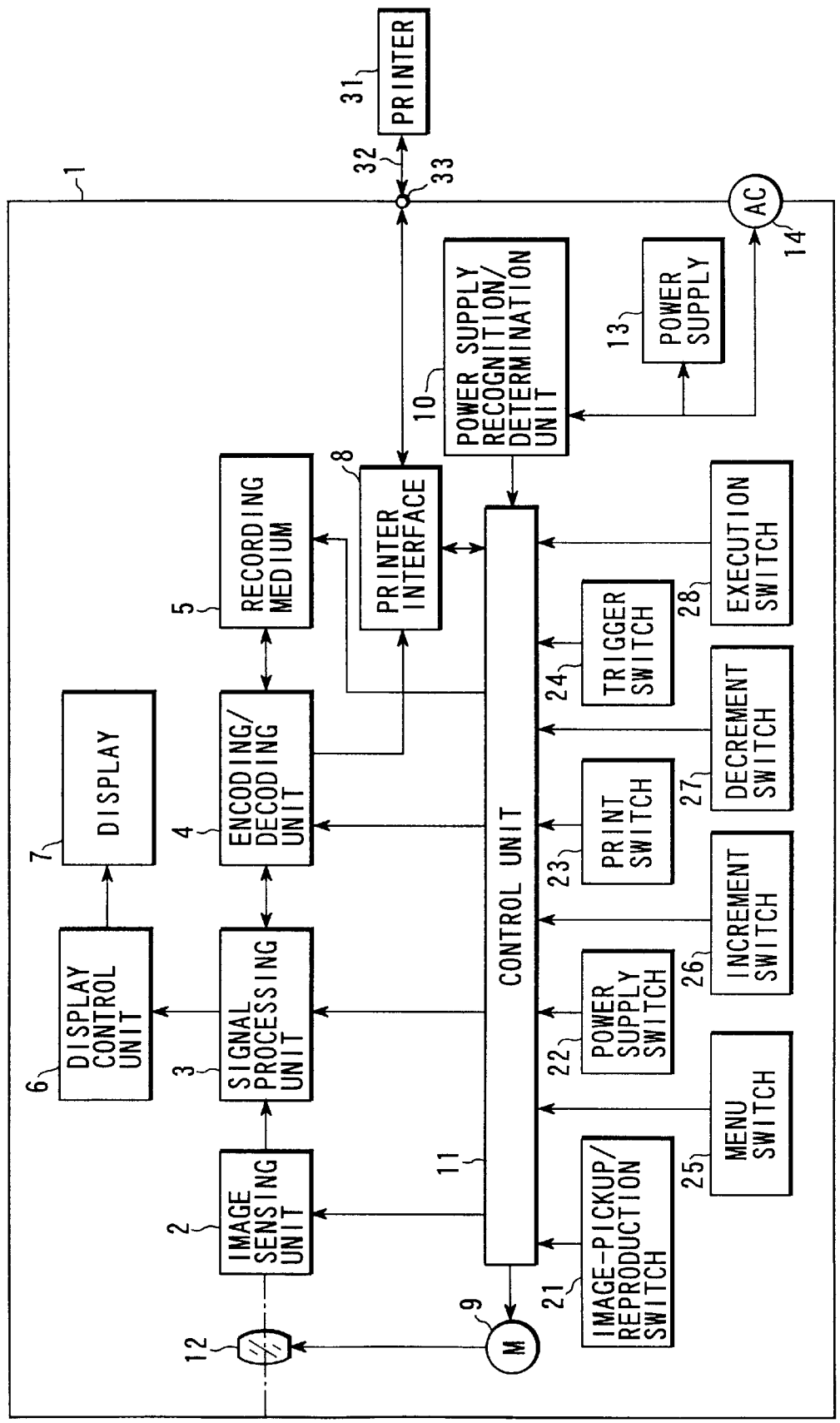
FIG. 3 is a block diagram of the main part of the electronic camera in FIG. 1.

As shown in FIG. 3, the electronic camera 1 comprises the image-pickup optical system 12 made up of an image-pickup lens and the like for forming the image of a subject to be picked up, an image sensing unit 2 which is made up of an image sensor such as a CCD and the like, photoelectrically converts the image information of the subject image formed by the image-pickup optical system 12, and A/D-converts the information, a signal processing unit 3 for processing an electrical signal such as digital image data from the image sensing unit 2 into a signal suitable for display or recording, an encoding/decoding unit 4 constituted by an encoder for receiving and encoding the image data processed by the signal processing unit 3 and a decoder for decoding image data recorded on a recording medium 5 built into or detachably mounted on the camera 1, and a display control unit 6 for controlling the display 7 serving as a display means such as an LCD for displaying an image and the like.

The overall electronic camera 1 is controlled by a control unit 11 made up of a CPU or the like. The control unit 11 is electrically connected to the image sensing unit 2, the signal processing unit 3, the encoding/decoding unit 4, the recording medium 5, a focusing driving motor 9 for driving the image-pickup optical system 12 and performing focusing, a power supply recognition/determination unit 10, and the like. The control unit 11 integrally controls these units. The power supply recognition/determination unit 10 has a power supply recognition function of recognizing the type and state of the driving power supply for driving the electronic camera 1, and a determination function of determining the operation control of the camera 1, e.g., whether the display function is limited during, e.g., printing on the basis of the recognition results of power supply recognition.

The electronic camera 1 comprises a driving power supply unit constituted by an internal power supply 13 using a dry battery, lithium battery, or the like as a driving power supply, and an external power supply connector 14 for receiving power from an external power supply such as an AC power supply. The electronic camera 1 is generally mainly driven by the internal power supply (battery) 13, and receives power from the external power supply via the external power supply connector 14 in printing or the like. The internal power supply 13 and the external power supply connector 14 are electrically connected to the power supply recognition/determination unit 10, which allows the unit 10 to always monitor the state of the driving power supply of the camera 1.

In general, the external power supply connector 14 is connected not directly to a commercial AC power supply but to an AC power supply adapter for rectifying the commercial AC power supply and outputting a DC power corresponding to the driving power supply. The external power supply connector 14 can also be connected to a battery adapter capable of storing a large-capacity battery.

The power supply recognition/determination unit 10 determines the driving power supply by mechanically or electrically detecting the external power supply connected to the external power supply connector 14. That is, when no external power supply is connected to the external power supply connector 14, the power supply recognition/determination unit 10 recognizes that the internal power supply (battery) 13 is used as a driving power supply. More specifically, connection of the external power supply can be detected by arranging, to the connector 14, a switch which operates upon connection of the external power supply to the external power supply connector 14.

The control unit 11 is electrically connected to various switches interlocked with various operation buttons (see FIGS. 1 and 2) attached to the respective portions of the outer cover members 15 and 16 (see FIGS. 1 and 2) of the electronic camera 1, i.e., the image-pickup/reconstruction switch 21, the power supply switch 22, the print switch 23, the trigger switch 24, the menu switch 25, the increment switch 26, the decrement switch 27, the execution switch 28, and the like. The control unit 11 controls the respective constituent components of the electronic camera 1 on the basis of various commands generated from these switches.

The electronic camera 1 can be connected to a printer 31 as an external printing means via a data transfer cable 32. That is, the electronic camera 1 comprises a printer interface 8 serving as a communication means with the printer 31, and a cable connector 33 which is connected to the printer interface 8 and to which the data transfer cable 32 is connected. With this arrangement, the electronic camera 1 can output image data output from the encoding/decoding unit 4 to the printer 31 via the interface 8, the connector 33, and the cable 32.

The operation of the electronic camera 1 having this arrangement will be explained.

In the imaging mode of the electronic camera 1, the image of a subject formed by the image-pickup optical system 12 is converted into an electrical signal to generate image data (digital signal) in the image sensing unit 2. The image data is subjected to a predetermined processing in the signal processing unit 3, and reconstructed and displayed on the display 7 via the display control unit 6. In this state, the operator operates the trigger switch button 24a to generate a trigger command as an image-pickup execution command. Upon reception of the trigger command, the control unit 11 accesses the recording medium 5 to record the image data on the recording medium 5 via the encoding/decoding unit 4.

In the reconstruction mode of the electronic camera 1, image data recorded on the recording medium 5 is decoded in the encoding/decoding unit 4. Then, the decoded data is processed by the signal processing unit 3, and reconstructed and displayed on the display 7 via the display control unit 6.

Figure 4:
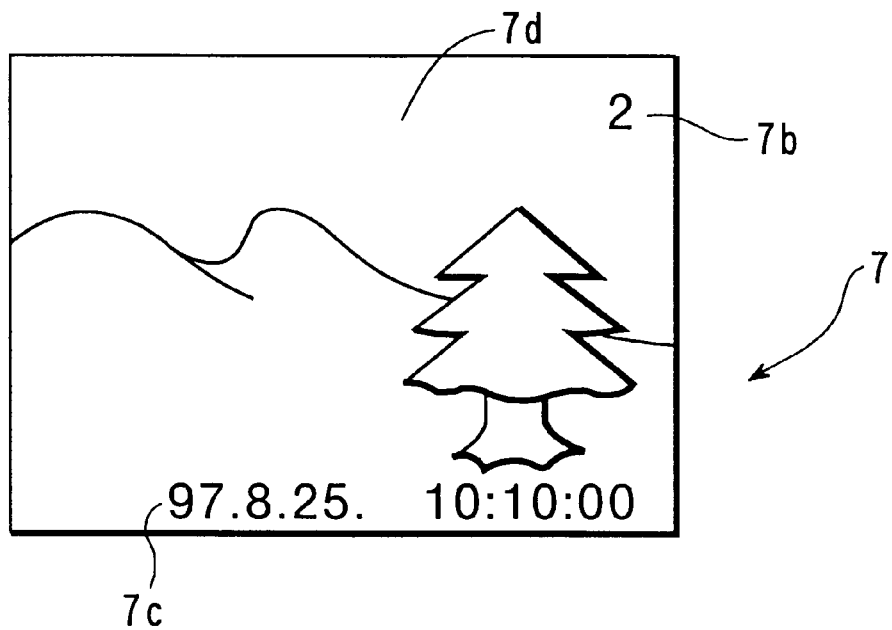
FIG. 4 is a view showing the state wherein an image is reconstructed and displayed on the screen of a display in the reconstruction mode of the electronic camera in FIG. 1.
Figure 5:
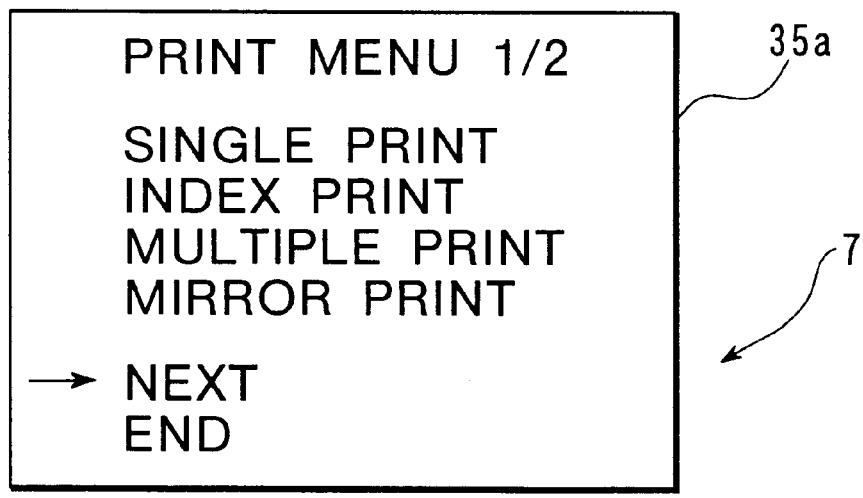
FIG. 5 is a view showing the print menu window in the electronic camera in FIG. 1.

FIG. 4 shows the state wherein an image is reconstructed and displayed on the screen of the display 7 in the reconstruction mode of the electronic camera 1. As described above, image data picked-up by the electronic camera 1 and recorded on the recording medium 5 includes attendant information such as image-pickup date information 7c and frame number information 7b, in addition to an image 7d. In reconstructing and displaying the image on the display 7, the attendant information can be displayed at a predetermined position on the image 7d, as shown in FIG. 4.

When the electronic camera 1 is set in the reconstruction mode, a reconstructed image is displayed on the screen of the display 7, and the electronic camera 1 is connected to the printer 31, the image can be printed by outputting the image data reconstructed and displayed on the display 7 to the printer 31.

More specifically, when the electronic camera 1 and the printer 31 are connected via the data transfer cable 32, and the electronic camera 1 is set in the reconstruction mode by turning on the power supply, predetermined image data of a plurality of image data recorded on the recording medium 5, e.g., an image corresponding to the largest frame number added for storage management, its attendant information, and the like are displayed on the screen of the display 7 of the electronic camera 1 (see FIG. 4). In this state, a desired image can be reconstructed and displayed on the screen of the display 7 by operating the increment switch button 26a and the decrement switch button 27a.

If the print switch button 30 is operated in this state, the print menu 35a (see FIG. 5) as the menu of a plurality of print execution commands corresponding to a plurality of different print states is displayed on the screen of the display 7. The operator can select a desired print mode from the contents displayed on the print menu 35a by operating the increment and decrement switch buttons 26a and 27a, and can execute predetermined printing by operating the increment switch button 26a and supplying a print execution command to the control unit 11.

The electronic camera 1 is mainly driven by the internal power supply 13 as a driving power supply such as a dry battery or lithium battery so as to allow the user to carry the electronic camera 1 and freely perform image-pickup at an arbitrary place. However, because of a relatively small capacity, it is difficult for the internal power supply (battery) 13 to continuously drive the electronic camera 1 for a long time.

When, therefore, image data is printed by outputting it from the electronic camera 1 to the printer 31, the camera 1 is generally driven by power supplied from an AC power supply. For printing within a relatively short time, printing can be executed even when the electronic camera 1 is driven by the internal power supply (battery) 13.

The display 7 is formed from, e.g., an LCD, but the LCD consumes large power upon long-time driving. The electronic camera 1 need not be operated till completion of printing in progress after a predetermined operation for executing printing. Accordingly, continuously driving the display 7 and continuously displaying the print menu 35a and the image on the display 7 during printing wastefully consume the power of the power supply.

In the electronic camera 1 of this embodiment, when the power supply recognition function of the power supply recognition/determination unit 10 recognizes the internal power supply (battery) 13 as the driving power supply of the camera 1, the control unit 11 controls the display 7 not to perform display during printing after the start of printing.

More specifically, in printing image data of the electronic camera 1 output to the printer 31, when the power supply recognition/determination unit 10 recognizes that the electronic camera 1 is driven with the battery, the control unit 11 stops driving the display 7 via the display control unit 6 in accordance with the recognition results of the power supply recognition/determination unit 10 upon detection of the start of printing.

Also in this case, for example, when the operator wants to confirm an image being printed or the setting of the print state using the print menu 35a prior to printing, the control unit can temporarily cancel interruption of driving of the display 7 and temporarily restore display on the display 7 by operating an operation member as a predetermined operation means attached to the electronic camera 1, e.g., one of the operation buttons 30, as needed. Then, desired information is displayed on the display 7, and the operator can confirm the image, setting, or the like. When display of the display 7 is temporarily restored during printing, if the image data of the electronic camera 1 is being printed after the lapse of a predetermined time, driving of the display 7 is interrupted again to stop display.

When the power supply recognition function of the power supply recognition/determination unit 10 recognizes that the electronic camera 1 receives power from an AC power supply connected via the external power supply connector 14, the display 7 keeps displaying the image even during printing.

According to this embodiment, when the power supply recognition function of the power supply recognition/determination unit 10 recognizes the internal power supply (battery) 13 as the driving power supply of the electronic camera 1, the display 7 stops displaying the image at the start of printing to suppress the power consumption of the electronic camera 1.

If necessary, the display 7 can temporarily restore the display even during printing by operating a predetermined operation member. The operator can confirm the image being printed, setting of the print state, or the like, as needed. If printing is in progress after the lapse of a predetermined time, the display 7 is automatically inhibited from displaying the image. Accordingly, the electronic camera of the present invention has excellent operability in printing and can contribute to power saving.

As has been described above, according to the present invention, the power supply recognition unit for recognizing the driving power supply is arranged. When this power supply recognition unit recognizes that the camera is driven with a small-capacity driving power supply, the display means stops displaying an image during printing after the start of printing. As a result, the electronic camera which realizes power saving by suppressing the power consumption and realizes excellent operability can be provided.

Additional advantages and modifications will readily occurs to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An electronic camera comprising:
   a driving power supply unit which can be selectively connected to, as a driving power supply, an internal power supply including a battery and an external power supply;
   a connector unit to which a printer can be connected;
   an image unit for sensing an image, generating image data, and processing the image data;
   a recording/reconstruction control unit for recording the image data from said image unit on a recording medium in an image-pickup mode, reconstructing a plurality of images from the recording medium in a reconstruction mode, and outputting the reconstructed image data via said connector unit to a connected printer;
   a display unit for selectively displaying a picture, a reconstructed image, and an operation menu;
   a power supply recognition/determination unit for at least recognizing whether the driving power supply is the battery; and
   a display control unit for inhibiting display by said display unit in response to outputting to a connected printer when said power supply recognition/determination unit recognizes the battery as the driving power supply.

2. An electronic camera according to claim 1, wherein said power supply recognition/determination unit determines presence/absence of interruption of display during outputting for printing on the basis of recognition results of power supply recognition.

3. An electronic camera according to claim 1, wherein said power supply recognition/determination unit mechanically or electrically detects connection of the external power supply and recognizes the driving power supply.

4. An electronic camera according to claim 1, wherein said display control unit displays the image data from said image unit on said display unit in the image-pickup mode, and displays image data reconstructed by said recording/reconstruction control unit on said display unit in the reconstruction mode.

5. An electronic camera according to claim 1, wherein said display control unit interrupts driving of said display unit during outputting for printing by a connected printer.

6. An electronic camera to claim 1, further comprising an operation member for temporarily overriding the inhibiting control unit function and resuming display on said display unit during outputting for printing.

7. An electronic camera according to claim 6, wherein said operation member comprises an operation button, and said display control unit temporarily resumes display by said display unit in response to operation of the button.

8. An electronic camera according to claim 6, wherein said power supply recognition/determination unit determines presence/absence of interruption of display during outputting for printing on the basis of recognition results of power supply recognition.

9. An electronic camera according to claim 6, wherein said power supply recognition/determination unit mechanically or electrically detects connection of the external power supply and recognizes the driving power supply.

10. An electronic camera according to claim 6, wherein said display control unit displays the image data from said image unit on said display unit in the image-pickup mode, and displays image data reconstructed by said recording/reconstruction control unit on said display unit in the reconstruction mode.

11. An electronic camera according to claim 6, wherein said display control unit interrupts driving of said display unit during outputting for printing by a connected printer.

12. An electronic camera driven by either an internal power supply or an external power supply, said camera comprising:
   a display unit;
   a printer port for connecting an external printer which prints an image captured by the electronic camera;
   an external power supply inlet for connection with an external power supply;
   a power supply recognition/determination unit for detecting connection of an external power supply and for generating an external power supply detection signal; and
   a control unit for controlling printing to an external printer connected to the printer port and for inhibiting operation of the display unit when the detection signal is not generated and when the external printer is printing.

* * * * *